United States Patent
Brandwine et al.

(10) Patent No.: US 10,691,822 B1
(45) Date of Patent: Jun. 23, 2020

(54) POLICY VALIDATION MANAGEMENT

(71) Applicant: Amazon Technologies, Inc., Reno, NV (US)

(72) Inventors: Eric Jason Brandwine, Haymarket, VA (US); Conor Patrick Cahill, Waterford, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 205 days.

(21) Appl. No.: 15/840,892

(22) Filed: Dec. 13, 2017

(51) Int. Cl.
*G06F 21/62* (2013.01)
*G06F 21/60* (2013.01)
*G06F 21/31* (2013.01)

(52) U.S. Cl.
CPC .......... *G06F 21/6218* (2013.01); *G06F 21/31* (2013.01); *G06F 21/602* (2013.01)

(58) Field of Classification Search
CPC ... G06F 21/33; G06F 21/6245; H04L 63/126; H04L 63/20; G06Q 20/389; G06Q 20/4016; G06Q 40/02; Y10S 707/99931
See application file for complete search history.

(56) References Cited

U.S. PATENT DOCUMENTS

| | | | |
|---|---|---|---|
| 7,353,532 B2 * | 4/2008 | Duri | G06F 21/6245 707/999.001 |
| 2013/0332984 A1 * | 12/2013 | Sastry | G06F 21/30 726/1 |

* cited by examiner

*Primary Examiner* — Abiy Getachew
(74) *Attorney, Agent, or Firm* — Hogan Lovells US LLP

(57) ABSTRACT

Validated policies can be utilized where information regarding the validation travels with the policies. A policy validator can validate information about a policy, such as may relate to compliance with policy requirements and accuracy of the policy output. Information about the validation, such as one or more claims of validity and information about the validator, can be provided with the policy as metadata, such as in a signature block. The signatures, or other verification mechanisms, can be used to ensure that the policy is not modified after the validation. When attempting to utilize the policy, the signature block can be evaluated along with the policy to determine whether to grant the access. In some embodiments the signature block may not be evaluated with the policy, but may be used subsequently for auditing or compliance determinations.

18 Claims, 5 Drawing Sheets

POLICY VALIDATION MANAGEMENT

BACKGROUND

Users are increasingly performing tasks using remote computing resources, often referred to as part of "the cloud." This has many advantages, as users do not have to purchase and maintain dedicated hardware and software, and instead can pay for only those resources that are needed at any given time, where those resources typically will be managed by a resource provider. Users can perform tasks such as storing data to various types of resources offered by a resource provider. The user often will have rules and policies regarding access to the user data, which may be in addition to any access policies of the resource provider. While providing a robust and flexible policy framework provides capabilities users desire, the complexity can result in policies that do not perform as expected. While a system could attempt to predict the impact of a change in policy, the inability to determine the source of the policy, or any changes to the policy, can make such predictions inaccurate at best.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches described and suggested herein relate to the management of access and actions with respect to data and resources in an electronic environment. In particular, various embodiments provide for validated policies, where information regarding the validation travels with the policies. A policy validator can validate information about a policy, such as may relate to compliance with a policy format and accuracy of the policy output. Information about the validation, such as one or more claims of validity and information about the validator, can be provided with the policy as metadata, such as in a signature block. The signatures, or other cryptographically sound verification mechanisms, can be used to ensure that the policy is not modified after the validation. When attempting to utilize the policy, the signature block can be evaluated along with the policy to determine whether to grant the access. In some embodiments the signature block may not be evaluated with the policy, but may be used subsequently for auditing or compliance determinations.

Various other such functions can be used as well within the scope of the various embodiments as would be apparent to one of ordinary skill in the art in light of the teachings and suggestions contained herein.

Figure 1:
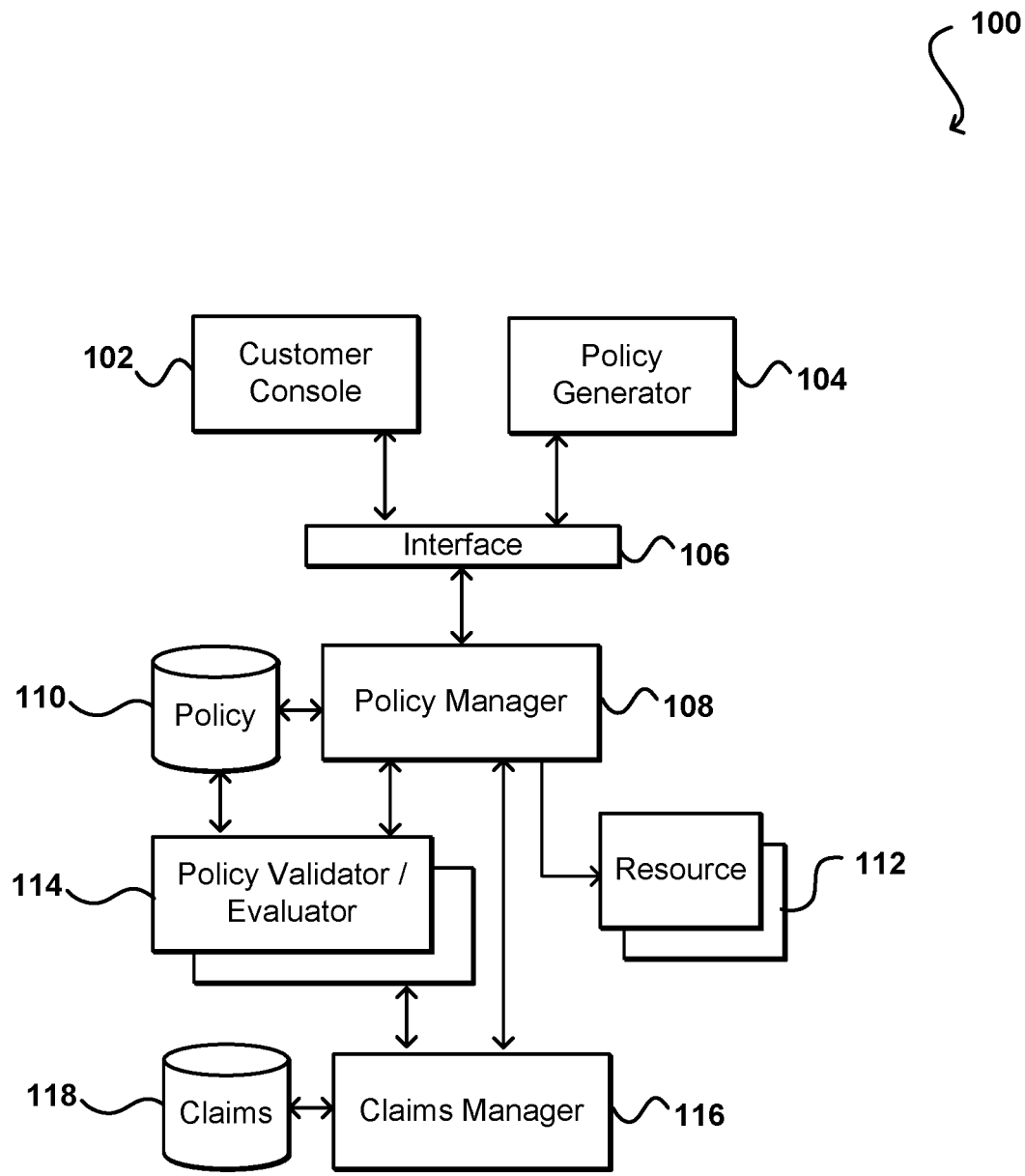
FIG. 1 illustrates components of an example system for validating policies that can be utilized in accordance with various embodiments.

FIG. 1 illustrates an example system 100 that can be utilized to implement aspects of the various embodiments. In this example, a policy manager 108 can manage access policies, and other policies, to be applied to, and enforced for, various electronic resources 112. Policies can be applied to other resources or entities as well as discussed elsewhere herein, as may include users or organizations, among other such options. As discussed in more detail elsewhere herein, the electronic resources can include any physical or virtual resources capable of receiving, storing, processing, and/or transmitting data electronically, as may include servers, databases, virtual machines, and the like. The policy manager 108 can store the policies to a policy data store 110, or other such location, and ensure that the relevant policies are enforced at least with respect to access to the relevant resources 112.

As mentioned, policies such as access policies can be received from various sources. For example, a customer can provide a customer-generated or customer-obtained policy through a customer console 102 or other such mechanism, which can call into an appropriate application programming interface (API) or other element of an interface layer in order to provide the policy to the policy manager 108. A customer can also use such a mechanism to modify or delete such a policy, among other such options. In some instances the policy might also be generated automatically or through a software mechanism such as a policy generator 104, which can be under control of a provider of the resources 112 or another authorized entity. If at least a subset of the resources are contained within a resource provider environment or multi-tenant environment, the policy generator 104 may be internal and/or external to that environment in different embodiments.

As mentioned, it can be difficult to properly generate, update, and/or configure policies to properly manage access by a variety of users to a variety of resources storing different types of data. Many customers want the ability to create precise access control policies, but this flexibility comes at the cost of added complexity, which makes it more likely that the policies will not be configured properly in all instances. Various embodiments provide a rich policy language that provides for a large variety of functionality, but the language is not complete and it can be difficult for users to understand all the various constructs of the policy language. It therefore can be desirable in at least some embodiments to provide a development layer on top of this policy language, which offers the flexibility but is simpler and more abstract, and thus more user friendly. Such an approach can be similar to many programming languages today, such as those built upon assembly language, etc. A higher level language can be utilized to develop a policy, and this language can then be compiled into a potentially machine-agnostic representation that then further compiles down into machine code, which can be transformed into and executed by the policy management system, for example Such an approach can be difficult, however, as conventional systems do not provide source information for the policy. For example, there is no reliable way to determine whether the policy was user-generated or produced by an automated policy manager, or another such option. The inability to determine the accurate source, for either the initial policy or any modifications to that policy, prevents the policy from being trusted or relied upon to perform in a certain way. Similarly, this can make it difficult to predict the impact of a change to the policy, when the existing functionality cannot be accurately determined.

Accordingly, approaches in accordance with various embodiments can provide a mechanism for indicating, within the policy itself, information about the generation and/or modification of the policy. Various approaches can also provide mechanisms for validating claims as to the generation or modification of the policy. In the system of FIG. 1, a policy manager 108 can receive a policy to be applied to one or more resources 112. The policy manager 108 can work with one or more policy validators 114 to attempt to validate the claims in the policy. In some embodiments the policy validators 114 can work with a claims manager 116 to validate the claims, both before accepting and applying a policy or at any time when the policy is to be applied, modified, or otherwise accessed or utilized. In other embodiments, the policy validators 114 themselves will attempt to validate the claims of a given policy. As discussed in detail elsewhere herein, claims can cover a wide variety of aspects with respect to a policy. For an access policy, for example, a claim might indicate that the resources are not publicly accessible, access is allowed for only certain accounts or from within an organization, access is only permitted at certain times, or access is never granted to a specific type of resource, among other such options.

When attempting to validate a claim of a policy, approaches in accordance with various embodiments can attempt to canonicalize the policy and/or claim(s) being validated. The canonicalization (or normalization) can involve converting the policy and/or claim to an approved or canonical form used by the validators. A claim in a canonical form can be more accurately analyzed and validated, and can help to distinguish between different instances of similar claims. For example, there may be two JSON documents that are semantically equivalent when evaluated by a conventional validation process, but those documents may be significantly different. Any of a number of canonicalization approaches can be used as appropriate for the type of claim or policy as would be apparent to one of ordinary skill in the art in light of the teachings and suggestions contained herein.

Once the document (or other data object) is canonicalized, a signature block or other such credential can be attached to, or otherwise associated with, the document. As an example, a signature block might indicate the owner of a private key for a policy generator or validator, for example, and might state that the owner verifies that the owner was the source of the policy, verified the output of the policy, or is making specific claims about the document. The signature block might also include information such as a checksum, signature, or other identifier for the specific document, such that the signature block would not be valid on a different document. The signature block and the canonicalized document can then be connected to each other such that they can flow together through the system as necessary. In one embodiment, the signature block information can be stored as a comment to a JSON document. Such an approach can be beneficial as the policy validators and/or evaluators 114 will not analyze the information, and may not be aware of the information in the comment section. Various other locations for storing the data can be utilized as well within the scope of the various embodiments. In some embodiments the information will simply be stored in the comment section such that if it is desired to investigate the source of a policy, such as where a customer bucket policy is misconfigured, the information can be used to attempt to determine a source of the problem. For example, a determination can be made as to the policy generator that was used, including the version and other such information contained in the signature. In some embodiments, as discussed elsewhere herein, the policy generator itself can generate an authentic, verifiable claim in addition to any of those generated by a policy validator. In some embodiments a policy with a valid claim from the policy generator may not need to have a subsequent validation performed or additional claim generated. The ability to determine such information about the policy can help to trace the source of the issue and provide for improved bug fixing and issue spotting. For example, once a version of a generator is identified as problematic, a search can be performed for other policies generated using that version as indicated in the policy information.

In some embodiments where the information is stored as a JSON comment or other user-accessible field or location, it is possible that a user will delete this comment. The user will not be able to modify the policy without detection, as the signature block would not match. In situations where the information is used for troubleshooting, the deletion of a comment would not necessarily impact performance but could make it more difficult to determine the source of an issue with a specific policy or set of policies.

In one example, an enterprise customer of a resource provider might have an agreement that is subject to a certain level of accountability. This can be, for example, a U.S. Health Insurance Portability and Accountability Act of 1996 (HIPPA) business associate agreement, among other such options. In order to ensure compliance with the requirements, the customer may be required to pass all relevant policies through a specified set of policy validators 114 to demonstrate that the customer is following the relevant HIPPA requirements. There may be contractual or legal obligations that can only be fulfilled if the customer policies are in conformance with a specified set of rules. If there is a breach of those rules, it can be important to quickly and accurately determine the cause of the breach such that the problem can be remedied. If the set of policy validators performs policy signing as discussed herein, the signature blocks can be investigated to quickly assist with the analysis. Potential issues can be identified, and any other potentially impacted policies flagged for investigation. As an example, the policy evaluation may have been modified for a certain version, where a prior version indicated that the policy was in compliance, but a current version would have detected the issue. A search can be performed to determine policies that were determined to be in compliance using the prior version, and those policies can be evaluated using the current version to attempt to identify similar issues that can be rectified. In some embodiments any relevant change to the evaluators, validators, generators, policies, or other components or aspects can also be logged to assist with the investigation.

As mentioned, in some embodiments the system can require that a policy have a validator block that complies with the relevant requirements. Such an approach can prevent any modifications to the policy (or at least provide for detection of any modifications) between the validation and evaluation stages. Such an approach can help to detect both internal and external modifications, as the signature block will not match the current version of the policy.

In some embodiments the validation itself can be used as part of an access policy. For example, a customer might indicate that an access policy cannot be used by a user to gain access unless a specific policy validator, validator version, etc., has validated the policy. Using such an approach, the policy might be uploaded and validated, but kicked out as invalid at evaluation time because the policy was not validated by the designated validator. Such restrictions can be referred to as policy restrictions, or meta policy restrictions, or policies on polices. These restrictions can be used on the claims as well in at least some embodiments.

As mentioned, in some embodiments the policy validators and/or evaluators 114 can work with a claims manager 116 or (logically) central claims store, among other such options. A policy source might make an API call to an API of the interface layer 106, for example, specifying one or more claims for a specified policy. Those claims can then be stored to the claims data store 118, for example, and accessible via the claims manager 116. In some embodiments the claims can effectively be immutable, or prevented from being changed, such as where a cryptographically strong has algorithm is used with the claims. The claims data store 118 in some embodiments can be a large, distributed hash table keyed from the checksum of the canonicalized policy, among other such options. In some embodiments, various signatures can be uploaded and revalidated, then stored for subsequent access.

In some embodiments a policy validator and/or evaluator can utilize automated reasoning techniques in analyzing a policy. Such an approach can semantically interpret a policy, process the interpreted policy using a theorem solver, and enable the testing of claims about the policy. In one example, a policy evaluation can be performed where is it indicated that a user attempting to download a data object from a particular resource at a specified date and time from a specific IP address. The evaluation can be provided with the relevant policies, such as the policy on the user, the policy on a user group, and a policy on the identified resource. The evaluation can represent this information as an abstract state against which claims can be tested. These are not just simple claims such as whether the request will be approved or denied, which might be typical for a policy validator, but can include claims such as whether the request would be approved from any source IP address or whether there are any addresses or user for which this request would be approved, among other such options. Such an approach provides analysis of potential requests for testing and verification purposes. By determining which requests would be granted or denied, logical statements can be formalized that can be proven true or false about a policy, such as access only being granted under this policy for a specific source address and associated with a specific account, etc. A customer can then test their policies using these constraints or invariances to ensure compliance across the policies.

As mentioned, the signature block can be stored in various locations other than as JSON comments. In various embodiments, the block and/or associated data can be stored as metadata that is associated with the policy, or set of policies, as discussed herein. The metadata does not necessarily need to be stored in the policy itself. In some embodiments the metadata can be made part of the document. The document has been canonicalized, and can then be expanded to include the metadata. In such an embodiment it may still be necessary to validate the signature, which may involve taking the checksum of a document within a document, which can be very resource intensive. Accordingly, a protocol can be established for extracting the signature from the expanded document. In order to conserve resources and simplify the process, the signature in many embodiments will be separate from, or "stapled to," the document. In other embodiments the metadata can be added to an envelope or outer layer for the document, among other such options.

An entity may also want to be able to separately validate and/or evaluate policies. The validator can take in a policy, canonicalize the policy, and add the appropriate signature block indicating that the policy was validated by that particular validator. The entity can take a public key or certificate, as may be issued by an identity manager such as a certificate authority. The entity can then specify that the specific public key or certificate is trustworthy within some identified scope, such that claims made by that validator can be evaluated by the various policy evaluators. Alternatively, a policy validator can be operated as a service, in which case much of the process would be similar but the entity would provide a policy and would be returned a policy stamped with a signature or comment block. The signature block, as well as other signature blocks discussed herein, can include a minimum set of information in some embodiments, such as may include a name or identifier of the validator, version information, validator settings, and the date and time at which the claims were made. When analyzing the validation information in the signature block, the information may not be complete or may include some discrepancy, etc. If the information is used forensically then no calls may fail as a result. A logging of the discrepancy might be performed in some embodiments. In other embodiments the policy may fail an evaluation, or another such action can be taken, such as to not allow upload of policies including that information. In other instances, the policies may have been validated but may be kicked out at evaluation time when the discrepancy or inaccuracy is detected.

Figure 2:
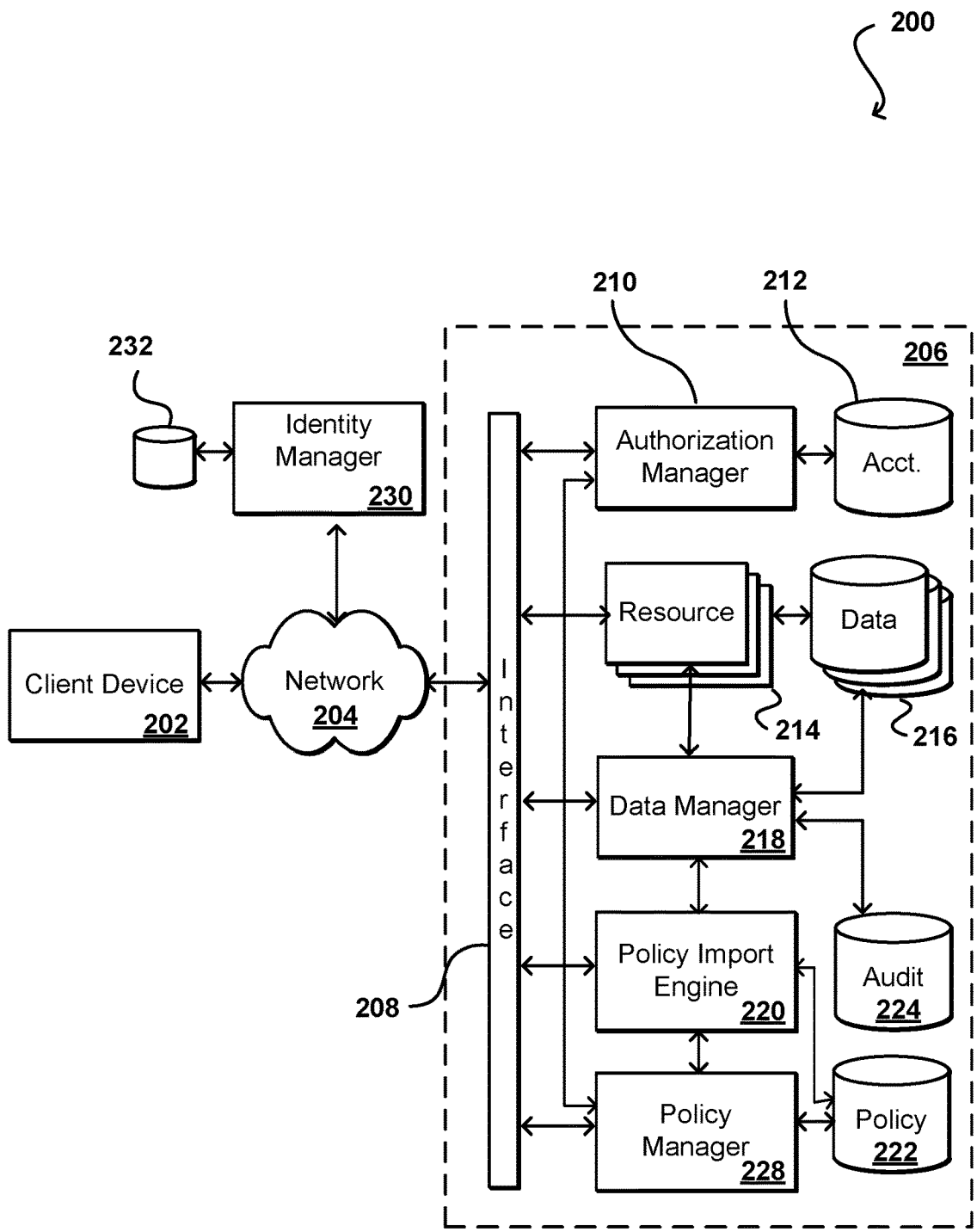
FIG. 2 illustrates an example environment in which various embodiments can be implemented.

FIG. 2 illustrates an example environment 200 in which aspects of the various embodiments can be implemented. In this example a user is able to utilize a client device 202 to submit requests across at least one network 204 to a resource provider environment 206. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 104 can include any appropriate network, including an intranet, the Internet, a cellular network, a local area network (LAN), or any other such network or combination, and communication over the network can be enabled via wired and/or wireless connections. The resource provider environment 206 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of electronic resources that can be utilized by multiple users for a variety of different purposes. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of electronic resources 214 of one or more types. These types can include, for example, application servers operable to process instructions provided by a user or database servers operable to process data stored in one or more data stores 216 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 214 can submit a request that is received to an interface layer 208 of the provider environment 206. The interface layer can include application programming interfaces (APIs) or other exposed interfaces enabling a user to submit requests to the provider environment. The interface layer 208 in this example can also include other components as well, such as at least one Web server, routing components, load balancers, and the like. When a request to provision a resource is received to the interface layer 208, information for the request can be directed to a resource manager, authorization manager 210, or other such system, service, or component configured to manage user accounts and information. A component such as a resource manager can also handle tasks such as resource provisioning and usage, and other such aspects. An authorization manager 210 receiving information for the request can perform tasks such as to authenticate an identity of the user submitting the request, as well as to determine whether that user has an existing account with the resource provider, where the account data may be stored in at least one account data store 212 or other such repository in the provider environment. A user can provide any of various types of credentials in order to authenticate an identity of the user to the provider. These credentials can include, for example, a username and password pair, biometric data, a digital signature, or other such information. The provider can validate this information against information stored for the user in the account data store 212. If the user has an account with the appropriate permissions, status, etc., information can be passed to the resource manager, which can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 202 to communicate with an allocated resource without having to communicate with the resource manager, at least until such time as a relevant aspect of the user account changes, the user is no longer granted access to the resource, or another such aspect changes.

The resource manager (or another such system or service) in this example can also function as a virtual layer of hardware and software components that handles control functions in addition to management actions, as may include provisioning, scaling, replication, etc. The resource manager can utilize dedicated APIs in the interface layer 208, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 208 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

As mentioned, a customer of such a resource environment might have data that is stored within to the various data storage devices, such as the data stores 216, as well as on-premises or other resources that may be outside the resource provider environment. The data can be managed using various policies that can be administered by a policy manager 228 and stored in a policy database 222 or other such location. A policy manager 228 in general can refer to a system, service, or component that performs tasks such as creating policies, associating policies with objects, maintaining the associations, providing access to policies, and other such tasks, including those described with respect to FIG. 1. Users can write policies such as predicate-based policies and lifecycle-based policies, wherein specific actions will be performed for objects with certain tags according to certain predicate-based policies (different policies can apply for different actions) and wherein a determined action will be performed for all objects with a specific tag for lifecycle-based policies.

A policy import engine 220 (or import/export engine) can be used in the resource provider environment, in conjunction with the policy manager 228, to import user-provided policies (or other policies generated outside the resource provider environment 206. A policy import engine can refer generally to one or more systems, services, or components that are configured to perform tasks such as the importing and exporting of policies, as well as determining whether those policies are able to be imported or exported, determining any conflicts, verifying ownership or access to various policies for import/export purposes, and the like. In some embodiments one or more policy validators would be contained within the import engine or would be utilized by the policy import engine. The policy import engine 220 can determine the "cloud" policies, or policies of the resource provider environment 206, that apply to the bucket or other location for which the user data is to be stored, and if the data and/or user policies violate a policy associated with the bucket then the policy can be rejected. In some embodiments the policy manager 220 works with the authorization manager 210 or other such components to determine authorizations of the user in addition to policies to be applied to such usage, and this information can be used for policy validation in addition to other such tasks. This can include, for example, determining which policies to apply for a specific task to be performed on behalf of a user. In some embodiments, federated identities can be used, as may be provided by various third parties, in order to determine the appropriate authorizations, policies, etc. A data manager 218 in some embodiments can manage changes and access to the data, for example, which can be performed in conjunction with an authorization manager 210, policy manager 228, etc. The data manager in some embodiments can monitor access to data, as well as the policies applied and used to obtain the access, and can log that information to an audit data store 224 or other such location, enabling subsequent auditing or verification as discussed elsewhere herein.

Once a policy is applied for a resource, or data stored by a resource, for example, the policy should be automatically enforced in the environment or on the storage platform where the data resides. Data management may be based on factors such as compliance requirements, information technology (IT) governance, and security policies that apply for a given user (i.e., enterprise). For example, a user can categorize a set of data as "log" data. The user can then manage all data that falls within this category using a specified set of policies. Data categorized in a separate category, such as "financial critical" data, may be subject to a different set of management policies, as may be specified by contract or otherwise. In order to provide the necessary flexibility for users, policies can be able to be specified for individual data objects. In the example of data on a file system, users manage permissions and metadata on individual files. Managing individual files, however, becomes increasingly difficult as the number of files grows. Similarly, users can be provided with the ability to write data management policies based on data or other classifications specified at the object level. Such ability enables users to exercise more control and better manage their data in the resource provider environment 206, as may simplify data management. An example includes the writing of a cross-region replication policy for sensitive user data. The policy manager 228 can provide access control to manage permissions for the adding, editing, and removal of policies for data objects stored in the data stores 216 of the resource provider environment 206. The engine in at least some embodiments can ensure that only authorized users have the ability to change policies on a data object, and that any changes are documented and/or logged for future reference.

A user can provide various types of credentials in order to authenticate an identity of the user to the provider, which can be used for claims validation and other operations discussed and suggested herein. These credentials can include, for example, a username and password pair, biometric data, a digital signature, a signed certificate, or other such information. These credentials can be provided by, or obtained from, a number of different entities, such as an identity manager 230, identify provider, a key management service, a corporate entity, a certificate authority, an identify broker such as a SAML provider, and the like. In some embodiments, a user can provide information useful in obtaining the credentials, such as user identity, account information, password, user-specific cryptographic key, customer number, and the like. The identity manager can provide the credentials, also stored to a credential data store 232, to the resource provider environment 206 and/or to the client device 202, whereby the client device can utilize those credentials to obtain access or use of various resources in the provider environment, where the type and/or scope of access can depend upon factors such as a type of user, a type of user account, a role associated with the credentials, or a policy associated with the user and/or credentials, among other such factors. Although shown external to the resource provider environment, it should be understood that the identity manager can be a logical part of the resource provider environment in some embodiments.

Figure 3:
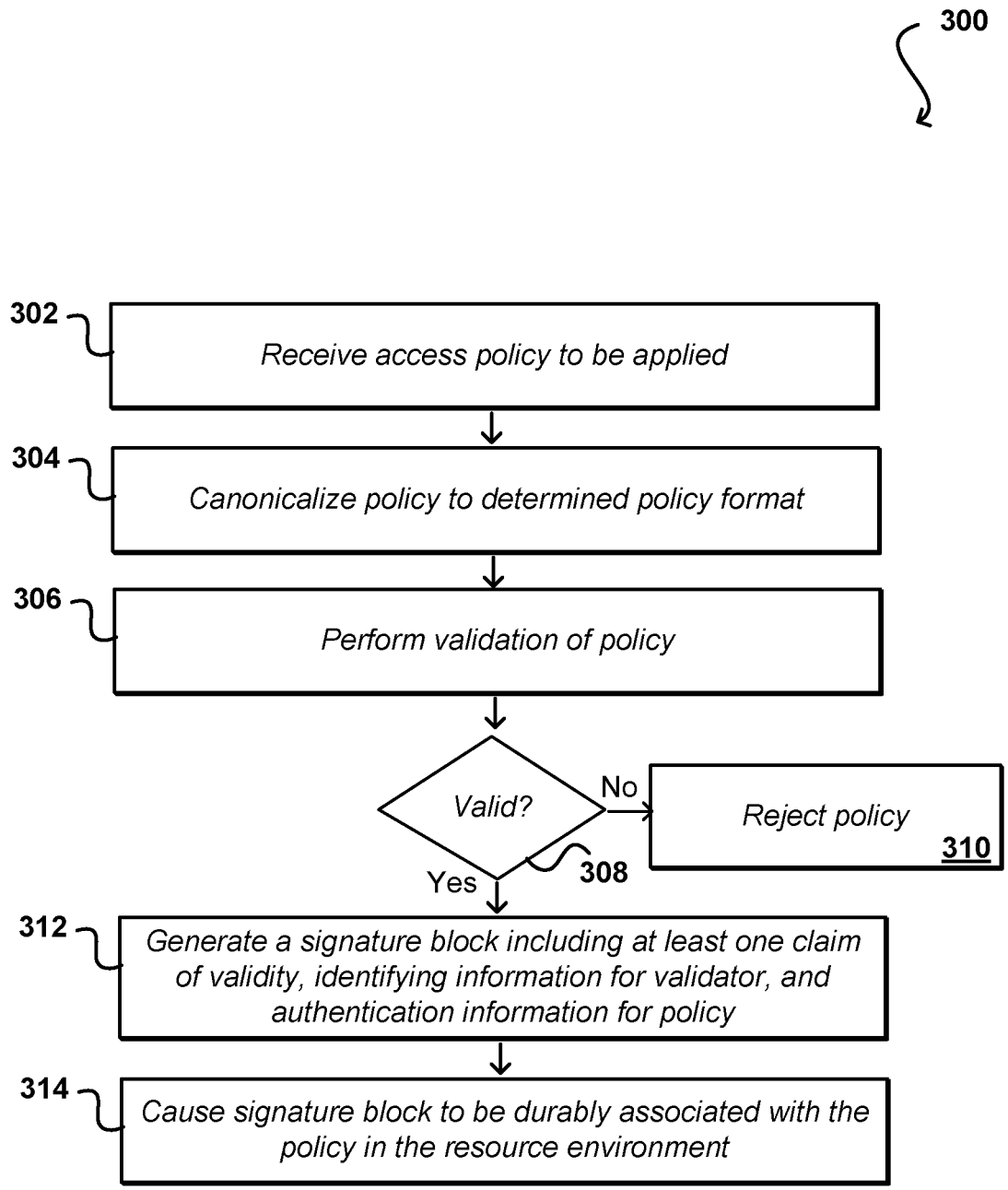
FIG. 3 illustrates an example process for validating an access policy that can be utilized in accordance with various embodiments.

FIG. 3 illustrates an example process 300 for validating an access policy that can be utilized in accordance with various embodiments. It should be understood that for this and other processes discussed herein that additional, fewer, or alternative steps can be performed in similar or alternative steps, or in parallel, within the scope of the various embodiments unless otherwise stated. Further, although access policies are discussed for purposes of explanation, it should be understood that various other types of policies or rules can take advantage of advantages of the various embodiments as well. In this example, an access policy is received 302 that is to be applied for one or more resources, data, users, etc. The policy can be received from any appropriate source, such as a customer or policy generator as discussed herein. In order to validate the policy, the policy can be passed to a selected policy validator. There may be several different validators, and the validator for the policy can be selected based upon any of various types of information, such as the type of policy, the source for the policy, the type of resource to be associated with the policy, among other such options. In some embodiments at least one specific validator, or a validator with at least a minimum type or version of functionality, may be required for a particular policy, or type of policy, as may be indicated by another higher level policy, among other such options. In order to process the policy, the policy can be canonicalized 304 to cause the policy to be in a format that is standardized for processing. At least one validation of the policy can be performed 306 as discussed herein, such as may attempt to verify that the policy complies with determined access policy grammar. An example policy is a JSON document written using the access management policy grammar which defines access permissions for a user, group, or role associated with the policy. If it is determined 308 that the policy is not valid, the policy can be rejected 310. In some embodiments a source of the policy can be prompted or notified of the non-compliance, for example, and can be requested to fix or update the policy. The policy can also be tested and the output analyzed to determine whether the policy functions as expected and in compliance with policy requirements, etc. If the policy is determined to be valid, a signature block can be generated 312 that includes one or more claims relating to the validation. The signature block can also include identifying information for the validator, including name and version information, for example, along with date and time of the validation. The signature block can also include authentication information for the policy, such as a checksum, certificate, or digital signature that can be used to verify that the policy corresponds to the validation and has not been altered since the validation. Various other and/or alternative information can be included as well as discussed and suggested herein. The signature block can be caused 314 to be durably associated with the policy in the resource provider environment. As mentioned, this can include expanding the policy document to include the signature block information, stapling the block to the document by placing the information in a comment or envelope for the document, or otherwise associating the block with the document such that the signature block travels with the policy document.

Figure 4:
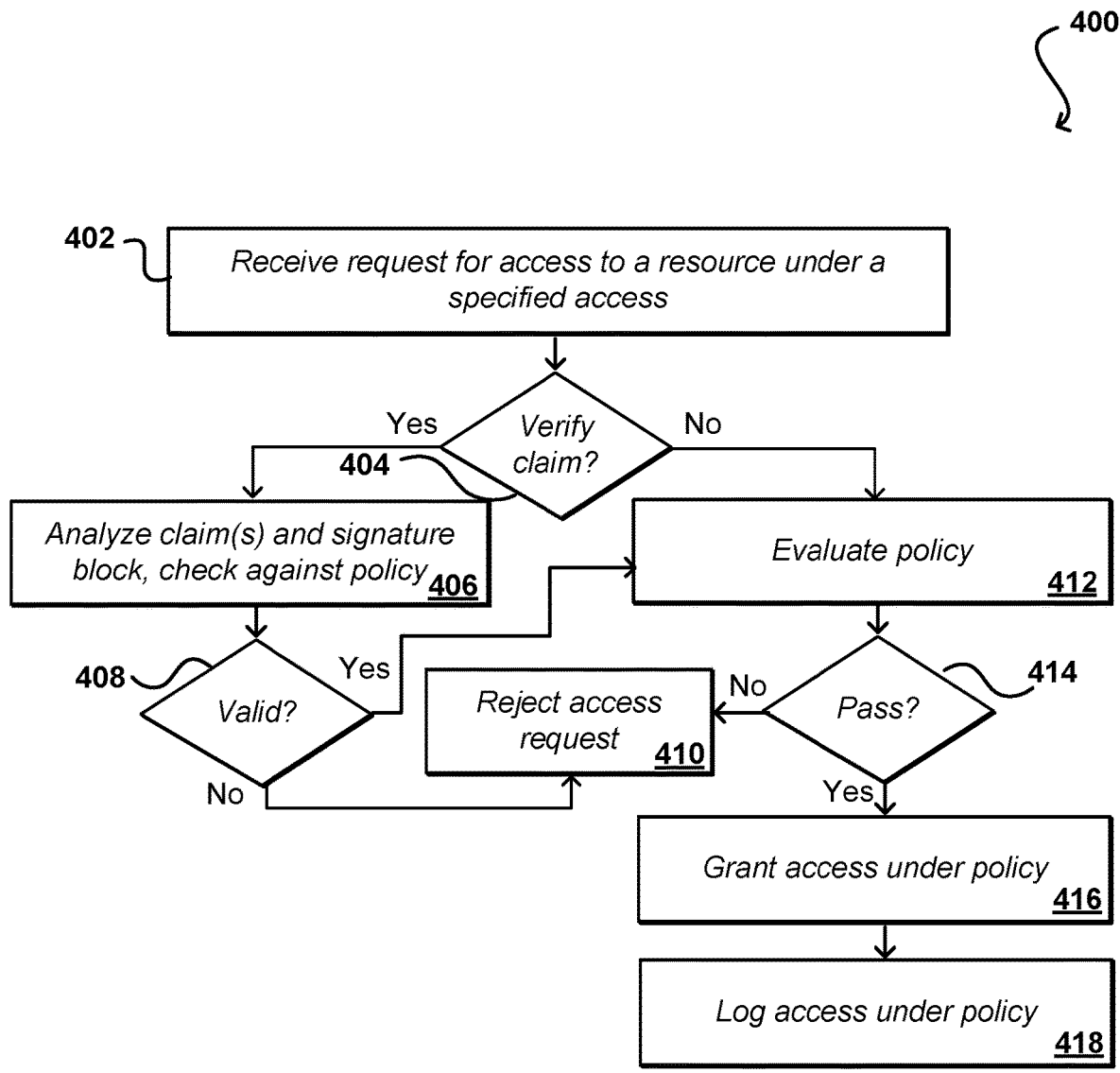
FIG. 4 illustrates an example process for evaluating an access policy that can be utilized in accordance with various embodiments.

FIG. 4 illustrates an example process 400 for evaluating such a policy that can be utilized in accordance with various embodiments. In this example, a request for access to a resource (or data stored by a resource, etc.) is received 402 from an appropriate source, such as a client device, customer application, or other resource, among other such options. A determination can be made 404 as to whether a claim made in the signature block, or other information in the signature block, is to be verified. As mentioned, in some embodiments the signature block information is used for auditing or investigation purposes, for example, and not used in the real time evaluation of a policy. If the claim is to be verified, the claim(s) in the block can be analyzed 406 along with other information in the signature block to ensure that the claim was not forged or is still accurate. This can include, for example, validating a signature, validating the policy, verifying the accuracy of a checksum, and other such tasks discussed and suggested herein. The claims can also be checked against the policy in at least some embodiments. As mentioned, in some embodiments the policy must have been validated by one or more specific validators in order to be used to obtain access or perform another action under the policy. Such an approach can help to ensure that policy does not become validated by deleting any or all claims previously associated with the policy. If it is determined 408 that the claim (or any relevant aspects of the policy document or signature) is not valid, the access request can be rejected or denied 410. If the claim is determined to be valid, or if claim validation is not required, then the policy can be evaluated using any appropriate evaluation and/or validation techniques discussed or suggested herein, which may or may not involve the signature as discussed. If the policy does not pass any or all relevant evaluation processes then the access request can be rejected 410. In some embodiments, the policy might also be invalidated as discussed elsewhere herein. If the policy passes the evaluation then access under the policy is granted 416, at least to the extent permitted under the policy. Access under the policy is also logged 418 for auditing or other such purposes.

Figure 5:
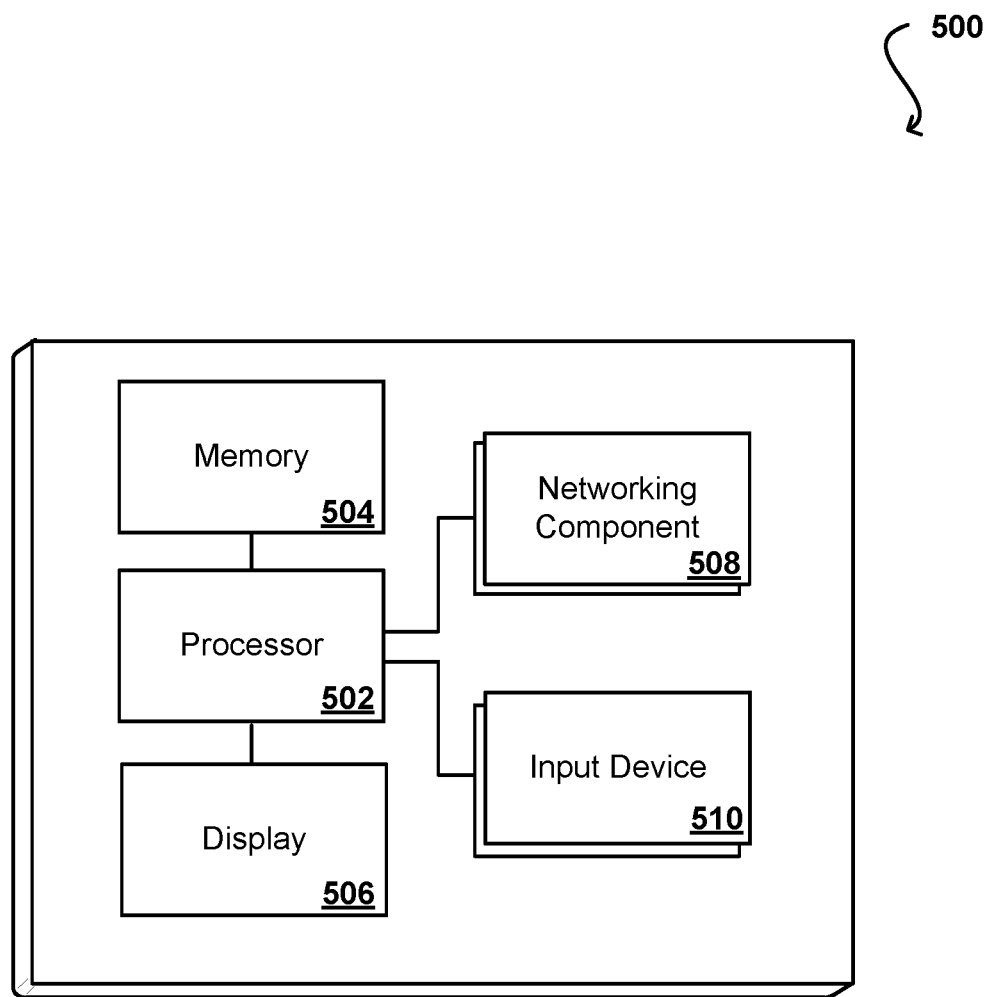
FIG. 5 illustrates example components of a computing device that can be used to implement aspects of various embodiments.

FIG. 5 illustrates a set of basic components of an example computing device 500 that can be utilized to implement aspects of the various embodiments. In this example, the device includes at least one processor 502 for executing instructions that can be stored in a memory device or element 504. As would be apparent to one of ordinary skill in the art, the device can include many types of memory, data storage or computer-readable media, such as a first data storage for program instructions for execution by the at least one processor 502, the same or separate storage can be used for images or data, a removable memory can be available for sharing information with other devices, and any number of communication approaches can be available for sharing with other devices. The device may include at least one type of display element 506, such as a touch screen, electronic ink (e-ink), organic light emitting diode (OLED) or liquid crystal display (LCD), although devices such as servers might convey information via other means, such as through a system of lights and data transmissions. The device typically will include one or more networking components 508, such as a port, network interface card, or wireless transceiver that enables communication over at least one network. The device can include at least one input device 510 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

As discussed, different approaches can be implemented in various environments in accordance with the described embodiments. As will be appreciated, although a Web-based environment is used for purposes of explanation in several examples presented herein, different environments may be used, as appropriate, to implement various embodiments. The system includes an electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C # or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising: receiving an access policy including one or more first claims to be applied to at least one resource in a multi-tenant resource environment; canonicalizing the access policy; evaluating the access policy using a policy validator; generating at least one second claim regarding a validity of the access policy as determined by the policy validator; generating a signature block including the at least one second claim, identifying information for the policy validator, data and time information for the at least one second claim, and authentication information for the access policy; causing the signature block to be associated with the access policy, wherein information regarding the second claim is available for subsequent analysis regarding use of the access policy; and granting access to the at least one resource based at least in part on a verification of the at least one second claim; canonicalizing the policy before performing the validation, wherein canonicalizing the access policy includes converting the policy into at least one approved policy format.

2. The computer-implemented method of claim 1, further comprising:
generating a policy document for the access policy; and
causing the signature block to be attached to the access policy by including the signature block in an expanded version of the policy document or including the signature block in a comment field for the policy document.

3. The computer-implemented method of claim 1, further comprising:

storing information for the claim to a claim repository in the multi-tenant resource environment, the information for the claim being associated with the access policy.

4. The computer-implemented method of claim 1, further comprising:
enforcing a policy indicating that only access policies having a specified type of signature block or validation are able to be utilized to gain access to at least one specified resource.

5. The computer-implemented method of claim 1, further comprising:
receiving a request for access under the access policy;
verifying a valid signature block attached to the access policy;
verifying that the access policy is associated with any required claim for the access policy; and
granting the access in response to successfully evaluating the access policy.

6. A computer-implemented method, comprising:
receiving a policy, the policy including a first claim, the policy to be enforced for one or more resources in an electronic resource environment; performing a validation of the policy using a policy validator; generating a validity claim for the policy separate from the first claim, the validity claim including at least identify information for the policy validator; associating the validity claim with the policy, along with a verification mechanism for verifying that the policy is unchanged since the validation by the policy validator; and granting access to the one or more resources based at least in part on a verification of the validity claim; canonicalizing the policy before performing the validation, wherein canonicalizing the access policy includes converting the policy into at least one approved policy format.

7. The computer-implemented method of claim 6, further comprising:
generating a cryptographically sound verification mechanism for the policy, including the validity claim and an authentication credential for the policy validator.

8. The computer-implemented method of claim 7, further comprising:
associating, with the policy, at least one of a date and time for the validation, a checksum for the policy, or a hash of the policy.

9. The computer-implemented method of claim 6, further comprising:
generating a policy document for the policy; and
associating the validity claim with the policy by expanding the policy document to include the validity claim or storing the validity claim as a comment to the document.

10. The computer-implemented method of claim 6, further comprising:
storing information for the validity claim to a claim repository in the electronic resource environment, the information for the claim being associated with the policy.

11. The computer-implemented method of claim 6, further comprising:
enforcing an additional policy indicating that only access policies having a specified type of validity claim are able to be utilized to gain access to resources under those access policies.

12. The computer-implemented method of claim 6, further comprising:
receiving a request for access under the policy;

verifying the validity claim associated with the policy;

verifying that the policy is associated with any required claim for the policy; and granting the access in response to successfully evaluating the policy.

13. The computer-implemented method of claim 6, further comprising:

determining that a specified claim, of a set of validity claims associated with the policy, is invalid;

determining that the specified claim is not required to grant access under the policy; and granting access under the policy if all validity claims required for access are determined to be valid.

14. The computer-implemented method of claim 6, further comprising:

providing an authenticated credential for the policy validator, the authenticated credential including at least one of an encryption key, a digital signature, or a signed digital certificate.

15. A system, comprising at least one processor; and memory including instructions that, when executed by the at least one processor, cause the system to: receive a policy, the policy including a first claim, the policy to be enforced for one or more resources in an electronic resource environment; perform a validation of the policy using a policy validator; generate a validity claim for the policy separate from the first claim, the validity claim including at least identify information for the policy validator; associate the validity claim with the policy, along with a verification mechanism for verifying that the policy is unchanged since the validation by the policy validator; and grant access to the one or more resources based at least in part on a verification of the validity claim; canonicalizing the policy before performing the validation, wherein canonicalizing the access policy includes converting the policy into at least one approved policy format.

16. The system of claim 15, wherein the instructions when executed further cause the system to:

generate the verification mechanism for the policy, including the validity claim and an authentication credential for the policy validator; and associate, with the policy, at least one of a date and time for the validation, a checksum for the policy, or a hash of the policy.

17. The system of claim 15, wherein the instructions when executed further cause the system to:

generate a policy document for the policy; and associate the validity claim with the policy by expanding the policy document to include the validity claim or storing the validity claim as a comment to the document.

18. The system of claim 15, wherein the policy includes a separate validity claim generated by a policy generator having generated the policy.

* * * * *